(12) United States Patent
Murata et al.

(10) Patent No.: US 8,077,392 B2
(45) Date of Patent: Dec. 13, 2011

(54) COMPOSITE OPTICAL ELEMENT

(75) Inventors: Jun Murata, Osaka (JP); Toshiaki Takano, Osaka (JP)

(73) Assignee: Panasonic Corporation, Osaka (JP)

( * ) Notice: Subject to any disclaimer, the term of this patent is extended or adjusted under 35 U.S.C. 154(b) by 425 days.

(21) Appl. No.: 12/304,619

(22) PCT Filed: Jun. 6, 2007

(86) PCT No.: PCT/JP2007/061479
§ 371 (c)(1),
(2), (4) Date: Dec. 12, 2008

(87) PCT Pub. No.: WO2007/145120
PCT Pub. Date: Dec. 21, 2007

(65) Prior Publication Data
US 2009/0147363 A1 Jun. 11, 2009

(30) Foreign Application Priority Data
Jun. 13, 2006 (JP) .................. 2006-163603

(51) Int. Cl.
G02B 5/18 (2006.01)
G02B 3/08 (2006.01)
(52) U.S. Cl. ..................... 359/576; 359/742
(58) Field of Classification Search .......... 359/576, 359/742
See application file for complete search history.

(56) References Cited

U.S. PATENT DOCUMENTS

| | | | |
|---|---|---|---|
| 5,946,281 A * | 8/1999 | Ito et al. ............ | 369/112.07 |
| 7,271,956 B2 * | 9/2007 | Ishii .................. | 359/569 |
| 2001/0013975 A1 * | 8/2001 | Nakai ................ | 359/576 |
| 2005/0046947 A1 * | 3/2005 | Nakamura ........... | 359/576 |

FOREIGN PATENT DOCUMENTS

| | | |
|---|---|---|
| JP | 11-287904 | 10/1999 |
| JP | 2006-138924 | 6/2006 |

OTHER PUBLICATIONS

International Search Report for corresponding Application No. PCT/JP2007/061479 mailed Sep. 18, 2007.
Form PCT/ISA/237.
Form PCT/ISA/237, Dated Sep. 5, 2007.

* cited by examiner

*Primary Examiner* — Alessandro Amari
(74) *Attorney, Agent, or Firm* — Renner, Otto, Boisselle & Sklar, LLP (57) ABSTRACT

The present invention relates to composite optical elements, and particularly to a composite optical element in which second and third optical components are coupled to a first optical component. The present invention is advantageous in enhancing optical properties. A composite optical element (1) includes first, second and third optical components (10, 20, 30). The first optical component (10) has a lens surface (13). The second optical component (20) is coupled to the first optical component (10) at the lens surface (13) and has a lens surface (22) at a side opposite to a first coupling surface (21) at which the second optical component (20) is coupled to the first optical component (10). The third optical component (30) is coupled to the second optical component (20) at the lens surface (22) and has a lens surface (32) at a side opposite to a second coupling surface (31) at which the third optical component (30) is coupled to the second optical component (20). The lens surface (13) partially has a first uneven region (13*a*). The lens surface (22) partially has a third uneven region (22*a*). The lens surface (32) partially has a third uneven region (32*a*).

6 Claims, 5 Drawing Sheets

FIG. 8

COMPOSITE OPTICAL ELEMENT

TECHNICAL FIELD

The present invention relates to composite optical elements, and more particularly to a composite optical element in which second and third optical components are coupled to a first optical component.

BACKGROUND ART

Composite optical elements each including two or more optical components are known to date. For example, in a composite optical element including two optical components, these optical components, i.e., first and second optical components, are coupled to each other. Such composite optical elements are used in various optical systems, and can be used as lenses by forming diffraction structures in their coupling surfaces, for example.

Most of the diffraction structures formed in the coupling surfaces are grating structures each made of evenly-spaced small slits or grooves in a number of about several tens to about several hundreds per a fine spacing (about 1 mm), as disclosed in, for example, Patent Document 1. Upon incidence of light on such a diffraction structure, a diffracted luminous flux is generated in a direction determined by the pitch (spacing) between the slits or grooves and the wavelength of incident light. This diffracted luminous flux is focused on one point, thereby allowing a composite optical element having such a diffraction structure to function as a lens.

In the case of using a composite optical element as a lens, a composite optical element in which a second optical component made of resin is coupled to a first optical component made of glass is employed, for example. Such a structure achieves a diffraction efficiency of 90% or more in a wide wavelength range from h-line (404.7 nm) to C-line (656.3 nm) by utilizing a wavelength characteristic opposite to that of a general lens made of a single glass or a single resin, i.e., by utilizing a characteristic in which the refractive index increases as the wavelength increases.

Patent Document 1: Japanese Laid-Open Patent Publication No. 11-287904

DISCLOSURE OF INVENTION

Problems that the Invention is to Solve

As described above, a composite optical element includes two or more optical components and these optical components are made of different materials in many cases. Thus, it is difficult to enhance optical properties thereof.

It is therefore an object of the present invention to provide a composite optical element with enhanced optical properties.

Means of Solving the Problems

A composite optical element according to the present invention includes: first, second and third optical components. The first optical component has a first optical functional surface. The second optical component is coupled to the first optical component at the first optical functional surface and has a second optical functional surface at a side opposite to a first coupling surface of the second optical component at which the second optical component is coupled to the first optical component. The third optical component is coupled to the second optical component at the second optical functional surface and has a third optical functional surface at a side opposite to a second coupling surface of the third optical component at which the third optical component is coupled to the second optical component. The first, second and third optical functional surfaces partially have first, second and third uneven regions, respectively.

EFFECTS OF THE INVENTION

The present invention may enhance optical properties.

BRIEF DESCRIPTION OF DRAWINGS

FIGS. 2(*a*) through 2(*f*) are cross-sectional views showing a method for manufacturing a composite optical element according to Embodiment 1.

DESCRIPTION OF NUMERALS

1, 2, 3, 101, 201, 301, 401 composite optical element
10, 40 first optical component
12, 42 lens surface (first optical functional surface)
12*a*, 42*a* first uneven region
13, 43 lens surface (fourth optical functional surface)
20 second optical component
21 first coupling surface
22 lens surface (second optical functional surface)
22*a* second uneven region
30 third optical component
31 second coupling surface
32 lens surface (third optical functional surface)
32*a* third uneven region
43*a* fourth uneven region
50 fourth optical component
51 third coupling surface
52 lens surface (fifth optical functional surface)
52*a* fifth uneven region

BEST MODE FOR CARRYING OUT THE INVENTION

Hereinafter, embodiments of the present invention will be described with reference to the drawings. It should be noted that the present invention is not limited to the following embodiments.

Embodiment 1

In Embodiment 1, a composite lens is described as a specific example of a composite optical element. Specifically, a structure and a manufacturing method thereof are described.

Figure 1:
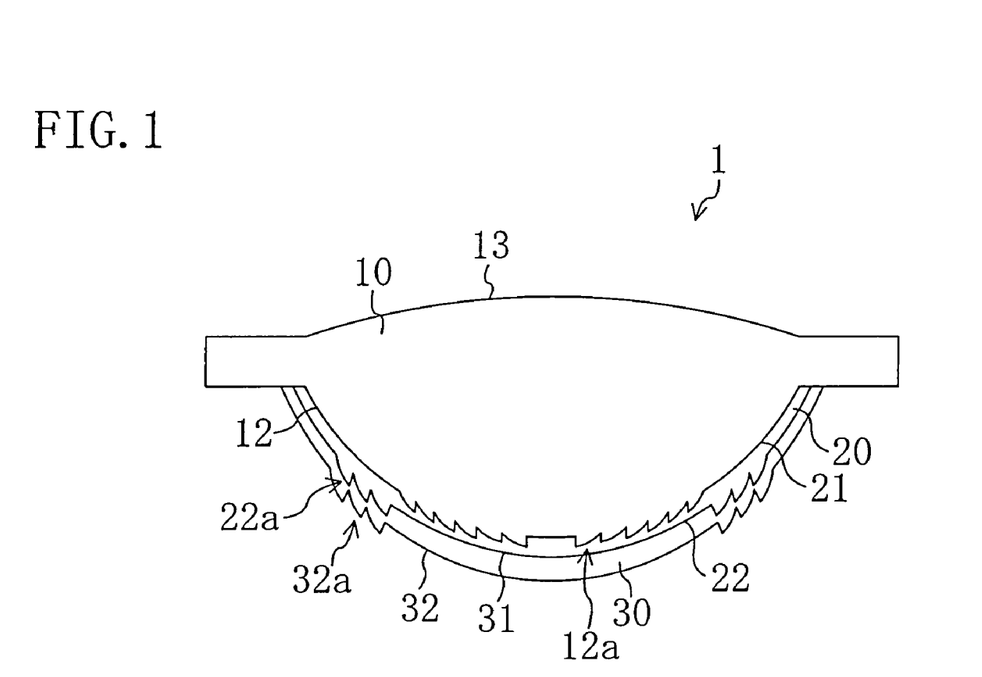
FIG. 1 is a cross-sectional view schematically illustrating a composite optical element according to Embodiment 1.

FIG. 1 is a cross-sectional view schematically illustrating a structure of a composite optical element 1 according to this embodiment.

The composite optical element 1 of this embodiment includes first, second and third optical components. The first optical component 10 has a lens surface (first optical functional surface) 12 and a lens surface (fourth optical functional surface) 13. The second optical component 20 is coupled to the first optical component 10 at the lens surface 12 and has a lens surface (second optical functional surface) 22 at the side opposite to the first coupling surface 21. The third optical component is coupled to the second optical component 20 at the lens surface 22 and has a lens surface (third optical functional surface) 32 at the side opposite to the second coupling surface 31. The lens surface 12 partially has a first uneven region 12a. The lens surface 22 partially has a second uneven region 22a. The lens surface 32 partially has a third uneven region 32a.

In general, to make an uneven region as a diffraction part or the like, this uneven region needs to be accurately formed. In the composite optical element 1 of this embodiment, the first, second and third uneven regions 12a, 22a and 32a are formed in part of the lens surfaces 12, 22 and 32, respectively. Accordingly, the uneven regions of the composite optical element 1 of this embodiment may be accurately and easily formed in a desired shape, as compared to a composite optical element in which an uneven region is formed in the entire lens surface. As a result, degradation of optical properties (such as aberration and light-focusing efficiency) may be prevented.

The composite optical element 1 of this embodiment is now specifically described. The first optical component 10 is made of first glass. The lens surface 12 and the lens surface 13 are aspherical. The lens surface 13 has no uneven regions and is formed smooth, whereas the lens surface 12 has the first uneven region 12a and a first smooth lens surface (not shown). The first uneven region 12a surrounds the optical axis of the first optical component 10 and, more specifically, is located on the circumference of a circle about a point on the optical axis. The first uneven region 12a functions as a diffraction part. The first smooth region is closer to the rim than the first uneven region 12a. Accordingly, optical power at the lens surface 12 differs between the first uneven region 12a and the first smooth region.

The second optical component 20 is made of a first resin. The first resin may be an energy-curing resin or a thermoplastic resin. The melting temperature of the first resin is preferably lower than the glass transition temperature of the first glass. The energy-curing resin herein is one of a thermosetting resin, a UV-curing resin, and an electron beam-curing resin, for example, and is cured with application of given energy (e.g., heat, UV rays, or electron beams). The lens surface 22 has a second uneven region 22a and second and third smooth regions (not shown). Specifically, the lens surface 22 is configured in such a manner that the second smooth region, the second uneven region 22a, and the third smooth region are arranged in order in the direction from the optical axis to the rim, i.e., are concentrically arranged with respect to a point on the optical axis. Accordingly, optical power at the lens surface 22 differs between the second and third smooth regions and the second uneven region 22a.

The third optical component is made of a second resin. The second resin may be an energy-curing resin or a thermoplastic resin. The melting temperature of the second resin is preferably lower than that of the first resin. The lens surface 32 has a third uneven region 32a and fourth and fifth smooth regions (not shown). Specifically, the lens surface 32 is configured in such a manner that the fourth smooth region, the third uneven region 32a, and the fifth smooth region are arranged in order in the direction from the optical axis to the rim, i.e., are concentrically arranged with respect to a point on the optical axis. Accordingly, optical power at the lens surface 32 differs between the fourth and fifth smooth regions and the third uneven region 32a.

Arrangement of the uneven regions and the smooth regions in the whole composite optical element 1 is now described. The second and third uneven regions 22a and 32a overlap the first uneven region 12a when viewed in the optical axis direction of the composite optical element 1. Accordingly, when viewed from the bottom of the composite optical element 1 in FIG. 1, each of the second and fourth smooth regions overlaps the first uneven region 12a near the optical axis of the composite optical element 1, each of the second and third uneven regions 22a and 32a overlaps the first uneven region 12a in an area closer to the rim, and each of the third and fifth smooth regions overlaps the first smooth region in an area much closer to the rim. In this manner, three regions exhibiting different levels of optical power are present at the bottom of the composite optical element 1 illustrated in FIG. 1 so that the composite optical element 1 can focus three light beams having different wavelengths.

FIGS. 2(a) through 2(f) are cross-sectional views schematically illustrating a method for manufacturing a composite optical element 1 according to this embodiment. First, in the method for manufacturing a composite optical element 1, a first optical member 155 is press-molded in process steps shown in FIGS. 2(a) and 2(b). Then, in process steps shown in FIGS. 2(c) and (d), a second optical member 165 is coupled to the first optical member 155 by press-molding. Then, in process steps 2(e) and 2(f), a third optical member is coupled to the second optical member 165 by press-molding. A composite optical element 1 is manufactured by press-molding in this manner, thereby allowing an aspherical lens surface and an uneven region having a sawtooth section to be molded at a time and also enabling the molding to be easily and accurately performed. Now, the manufacturing method is specifically described.

Figure 2:
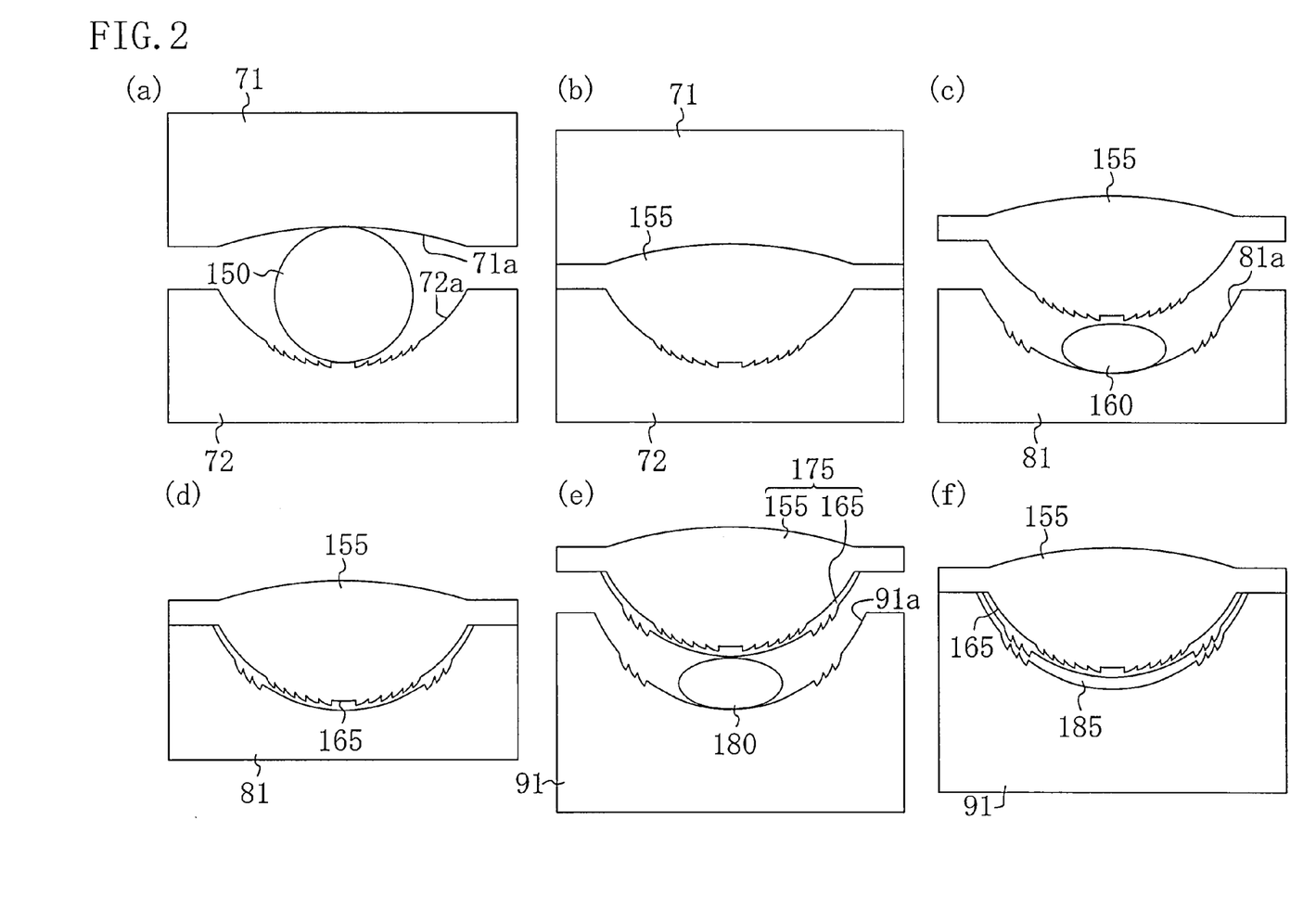

First, as shown in FIG. 2(a), a glass preform 150 and a molding device are prepared. The glass preform 150 preferably has a shape approximately the same as that of the first optical member 155. The molding device includes an upper die 71 and a lower die 72. The upper die 71 has a molding surface 71a for molding an upper lens surface (i.e., a lens surface to be a lens surface 13 of a first optical component 10) of the first optical member 155. The lower die 72 has a molding surface 72a for molding a lower lens surface (i.e., a lens surface to be a lens surface 12 of the first optical component 10) of the first optical member 155. Therefore, the molding surface 72a partially has unevenness corresponding to a first uneven region. The lower die 72 is placed with the molding surface 72a facing upward. On this molding surface 72a, a first resin preform 160 is mounted. Then, the upper die 71 is placed on the first resin preform 160 with the molding surface 71a facing downward.

Next, as shown in FIG. 2(b), pressing is performed so that the molding surfaces 71a and 72a of the upper and lower dies 71 and 72 are transferred onto the surface of the first resin preform 160. In this pressing, the upper die 71 may be pressed against the surface of the first resin preform 160, the lower die 72 may be pressed against the surface of the first resin preform 160, or both the upper and lower dies 71 and 72 may be pressed against the surface of the first resin preform 160. Then, the first resin preform 160 is cooled. In this manner, the first optical member 155 is molded.

Then, as shown in FIG. 2(c), a first resin preform 160 and a molding device are prepared. The resin preform 160 is preferably melted before being mounted on the molding device, and is preferably made of a resin having a softening temperature lower than the glass transition temperature of the glass preform 150. The molding device includes a lower die 81. The lower die 81 has a molding surface 81a for molding a lens surface of the second optical member 160. For this purpose, the molding surface 81a partially has unevenness corresponding to a second uneven region. Then, the lower die 81 is set with the molding surface 81a facing upward, then the softened first resin preform 160 is mounted on the molding surface 81a, and then the first optical member 155 is mounted on the first resin preform 160. The first optical member 155 is mounted on the lower die in such a manner that the optical axis of the first optical member 155 coincides with the center axis of the molding surface 81a of the lower die 81 so that the second optical member 165 is coupled to the first optical member 155 with their optical axis direction matching each other.

Thereafter, as shown in FIG. 2(d), the first optical member 155 is pressed against the lower die 81. At this time, since the softening temperature of the first resin preform 160 is lower than that of the glass preform 150, it may be possible to prevent the first optical member 155 from being melted at the coupling surface even upon coupling of the melted first resin preform 160 to the first optical member 155. As a result, deformation of the lower lens surface of the first optical member 155 may be prevented. In addition, the first resin preform 160 flows in accordance with the shape of the lens surface of the second optical member 165 to enter the uneven portion of the molding surface 81a so that the shape of the molding surface 81a is transferred onto the surface of the first resin preform 160 in a preferable manner. Consequently, a coupled body 175 constituted by the first optical member 155 and the second optical member 165 coupled to the first optical member 155 is formed.

Subsequently, as shown in FIG. 2(e), a second resin preform 180 and a molding device are prepared. The second resin preform 180 is preferably melted before being mounted on the molding device, and preferably has a softening temperature lower than that of the first resin preform 160. The molding device includes a lower die 91. The lower die 91 has a molding surface 91a. This molding surface 91a is used for molding a lens surface of the third optical member 185 and, therefore, partially has unevenness corresponding to a third uneven region. The lower die 91 is set with the molding surface 91a facing upward, then the softened second resin preform 180 is mounted on the molding surface 91a, and then the coupled body 175 is mounted on the second resin preform 180. If the coupled body 175 is mounted on the lower die 91 in such a manner that the optical axis of the coupled body 175 coincides with the center axis of the molding surface 91a of the lower die 91, the third optical member 185 is coupled to the coupled body 175 with their optical axis direction matching each other.

Thereafter, as shown in FIG. 2(f), the coupled body 175 is pressed against the lower die 91. At this time, since the softening temperature of the second resin preform 180 is lower than that of the first resin preform 160, it may be possible to prevent the second resin preform 180 from being melted at the coupling surface even upon coupling of the melted second resin preform 180 to the coupled body 175. As a result, deformation of the lower lens surface of the second optical member 165 may be prevented. In addition, as the first resin preform 160, the second resin preform 180 flows in accordance with the shape of the lens surface of the third optical member to enter the uneven portion of the molding surface 91a so that the shape of the molding surface 91a is transferred onto the surface of the second resin preform 180 in a preferable manner. In this manner, a composite optical element 1 illustrated in FIG. 1 is formed.

As described above, in the composite optical element 1 of this embodiment, the first, second and third uneven regions 13a, 22a and 32a are provided in parts of the lens surfaces 12, 22a and 32a, respectively. This enables the uneven regions to be accurately molded in a desired shape, as compared to the case where such uneven regions are provided in the entire lens surfaces. As a result, optical properties of the composite optical element 1 of this embodiment may be enhanced.

The composite optical element 1 of this embodiment is formed by press-molding. Accordingly, even an aspherical lens may be accurately formed by one molding process, and the first, second and third uneven regions 13a, 22a and 32a are easily formed by adjusting the shape of the molding surface of a molding die. Thus, unlike the case of forming a composite optical element 1 by employing a formation method (e.g. polishing or grinding) except for pressing, a composite optical element 1 may be manufactured with high yield.

A composite optical element 1 as disclosed herein is applicable to optical equipment such as an imaging device, an illuminating device, or an optical disk recording/reproducing device. An imaging device is used for imaging an object and is, for example, a digital still camera or a digital video camera. An illuminating device is used for illuminating an object and is, for example, a projector. An optical disk recording/reproducing device is used for recording/reproducing a Digital Versatile Disc (hereinafter, referred to as a DVD), a Compact Disc (hereinafter, referred to as a CD), or a Blu-ray Disc (a registered trademark, hereinafter, referred to as a BD®), for example. Generally, the wavelength of a light source for recording/reproducing and the thickness of an optical disk, for example, differ among DVDs, CDs, and BDs. Thus, to perform recording/reproducing on/from DVDs, CDs, and BDs with one optical disk recording/reproducing device, contrivance is needed for an optical system. The use of the composite optical element 1 of this embodiment may implement an optical disk recording/reproducing device having compatibility among a plurality of types of information recording media.

The shapes of the first, second and third optical components are not limited to those described above and may be in the form described in first through fourth modified examples below. The shapes of the first and second uneven regions are also not limited to those described above and may be in the form described in the first through fourth modified examples.

FIRST MODIFIED EXAMPLE

Figure 3:
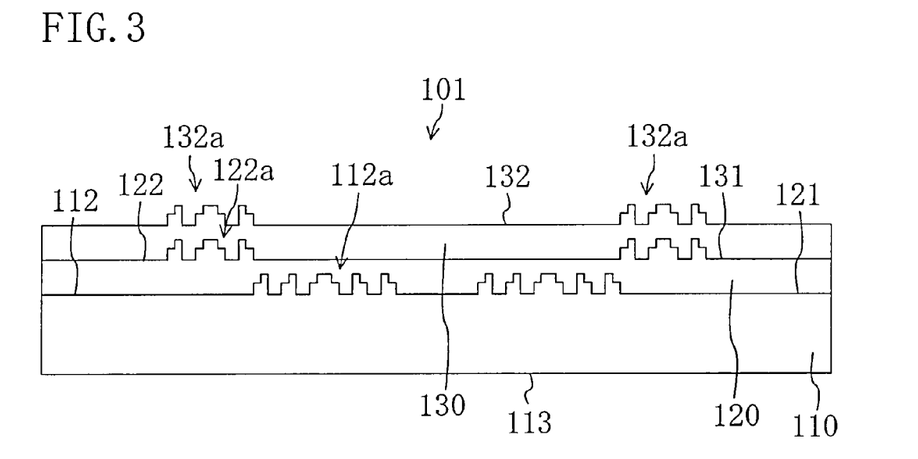
FIG. 3 is a cross-sectional view schematically illustrating a composite optical element according to a first modified example of Embodiment 1.

FIG. 3 is a cross-sectional view schematically illustrating a composite optical element 101 according to a first modified example. In the composite optical element 101 of this modified example, a first optical component 110 is formed in the form of a plate, and first, second and third uneven regions 112a, 122a and 132a are diffraction parts each having a stepped section.

Specifically, the first optical component 110 has a planar lens surface 112 and a planar lens surface 113. At the lens surface 112, a second optical component 120 is coupled to the first optical component 110. The second optical component 120 has a lens surface 122 at the side opposite to the first coupling surface 121. At the lens surface 122, a third optical component 130 is coupled to the second optical component 120. The third optical component 130 has a lens surface 132 at the side opposite to the second coupling surface 131. The lens surface 112, the lens surface 122, and the lens surface 132 partially have the first, second and third uneven regions 112a, 122a and 132a.

As in Embodiment 1, the composite optical element 101 of this modified example includes the first, second and third uneven regions 112a, 122a and 132a functioning as diffraction parts, and thus has substantially the same advantages as those in Embodiment 1.

SECOND MODIFIED EXAMPLE

Figure 4:
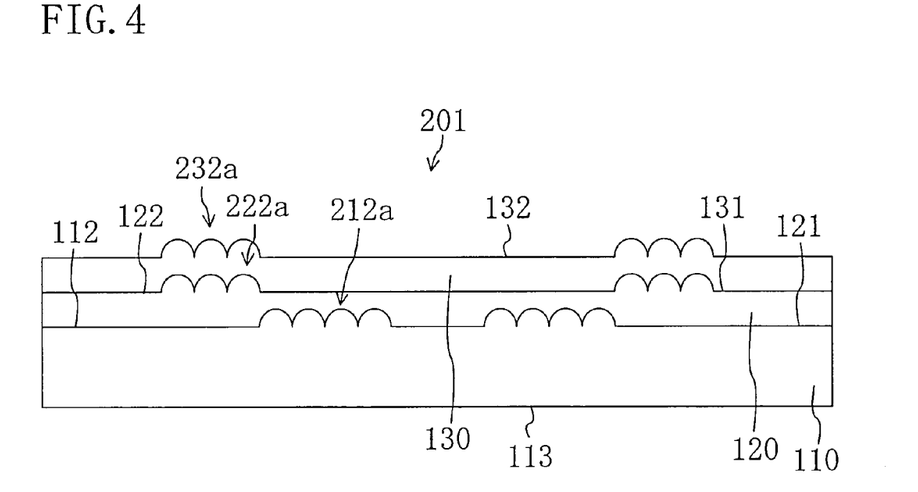
FIG. 4 is a cross-sectional view schematically illustrating a composite optical element according to a second modified example of Embodiment 1.

FIG. 4 is a cross-sectional view schematically illustrating a composite optical element 201 according a second modified example. In the composite optical element 201 of this modified example, a first optical component 110 is in the form of a plate, as the composite optical element 101 of the first modified example, but each of first, second and third uneven regions 212a, 222a and 232a is a lens array region in which a plurality of concave lenses are arranged.

As described above, the first, second and third uneven regions 212a, 222a and 232a are lens array regions in the composite optical element of this modified example. Accordingly, light having a wavelength $\lambda_1$ is focused by passing through an overlapping portion where both the second uneven region 222a and the third uneven region 232a are present when viewed in the optical axis direction, whereas light having a wavelength $\lambda_2 (\neq \lambda_1)$ is focused by passing through a portion where the second and third uneven regions 222a and 232a do not overlap when viewed in the optical axis direction.

THIRD MODIFIED EXAMPLE

Figure 5:
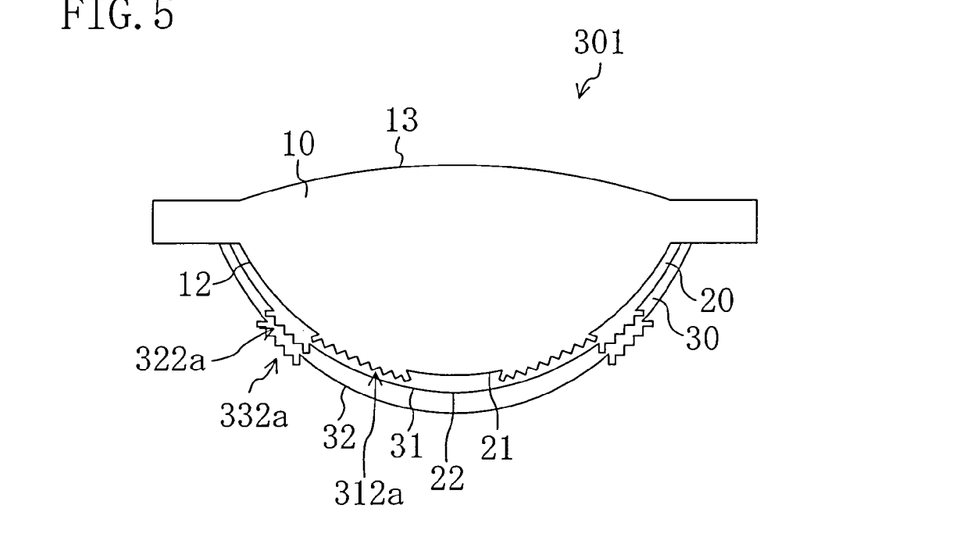
FIG. 5 is a cross-sectional view schematically illustrating a composite optical element according to a third modified example of Embodiment 1.

FIG. 5 is a cross-sectional view schematically illustrating a composite optical element 301 according to a third modified example. The composite optical element 301 of this modified example is approximately the same as the composite optical element 1 of Embodiment 1, but first, second and third uneven regions 312a, 322a and 332a are phase stepped regions each having a stepped section.

Since the first, second and third uneven regions 312a, 322a and 332a are phase stepped regions in the composite optical element 301 of this modified example, the phase of a luminous flux entering the first, second and third uneven regions 312a, 322a and 332a can be converted in the first, second and third uneven regions 312a, 322a and 332a.

FOURTH MODIFIED EXAMPLE

Figure 6:
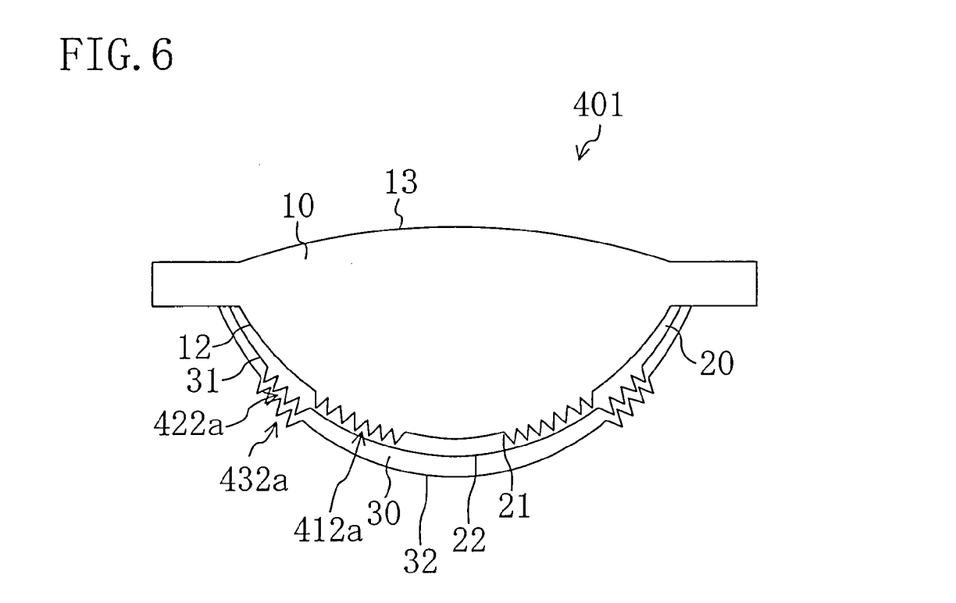
FIG. 6 is a cross-sectional view schematically illustrating a composite optical element according to a fourth modified example of Embodiment 1.

FIG. 6 is a cross-sectional view schematically illustrating a composite optical element 401 according to a fourth modified example. The composite optical element 401 of this modified example is approximately the same as the composite optical element 1 of Embodiment 1, but each of first, second and third uneven regions 412a, 422a and 432a is an antireflective region. Specifically, in each of the first, second and third uneven regions 412a, 422a and 432a, a plurality of projections in the form of cones are arranged at a pitch approximately equal to the wavelength for preventing reflection.

Since the first, second and third uneven regions 412a, 422a and 432a are antireflective regions in the composite optical element of this modified example, reflection of light with a wavelength approximately equal to the above-mentioned pitch may be prevented. The pitches of the first uneven region 412a may differ from the pitch of each of the second and third uneven regions 422a and 432a. Then, two light beams having different wavelengths can be prevented.

Embodiment 2

Figure 7:
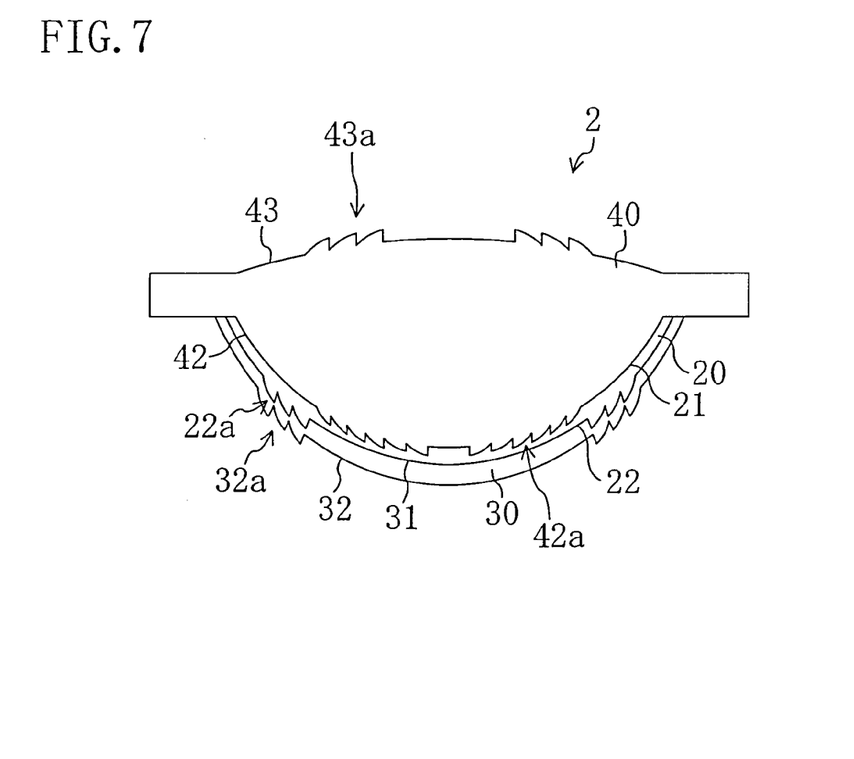
FIG. 7 is a cross-sectional view schematically illustrating a composite optical element according to Embodiment 2.

FIG. 7 is a cross-sectional view schematically illustrating a composite optical element 2 according to Embodiment 2. In the composite optical element 2 of this embodiment, a fourth uneven region 42a is also provided in a lens surface 42 of a first optical component 40. The fourth uneven region 42a may be a diffraction part having a sawtooth section as in Embodiment 1, or may be in the form described in one of the first through fourth modified examples.

Embodiment 3

Figure 8:
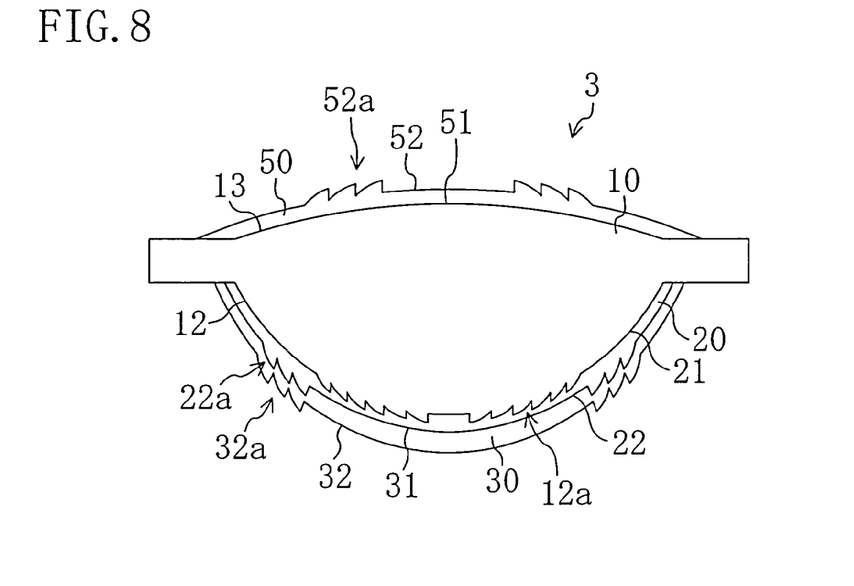
FIG. 8 is a cross-sectional view schematically illustrating a composite optical element according to Embodiment 3.

FIG. 8 is a cross-sectional view schematically illustrating a composite optical element 3 according to Embodiment 3. In the composite optical element 3 of this embodiment, a fourth optical component 50 is coupled to the lens surface 12 of the composite optical element 1 of Embodiment 1. The fourth optical component 50 has a lens surface (fifth optical functional surface) 52 at the side opposite to the third coupling surface 51. The lens surface 52 has a fifth uneven region 52a. The fifth uneven region 52a may be a diffraction part having a sawtooth section as disclosed in Embodiment 1 in the same manner as the fourth uneven region 42a of Embodiment 2, or may be in the form described in one of the first through fourth modified examples.

The fourth optical component 50 is made of a fourth resin. The softening temperature of the fourth resin is lower than that of the first resin. The relationship in level of the softening temperature of the fourth resin with respect to those of the second and third resins depends on the order of molding. Specifically, in the case of molding the first optical member, then molding the second and third optical members, and lastly molding the fourth optical member, the softening temperature of the fourth resin is preferably lower than those of the second and third resins. In contrast, in the case of molding the first optical member, then molding the fourth optical member, and lastly molding the second and third optical members, the softening temperature of the fourth resin is preferably higher than those of the second and third resins. That is, when a preform having a lower softening temperature is used later in the molding process, it is possible to form a composite optical element 3 without softening the already-molded optical member.

Other Embodiments

Embodiments 1 through 3 of the present invention may have the following structures.

The lens surfaces may be aspherical or planar, and further may be spherical, cylindrical, ellipsoidal, or toric.

The materials of the optical components are not specifically limited. Each of the optical components may be made of glass, or one or more of the optical components may be made of glass and the other optical component(s) may be made of resin. In the optical components, an impurity not affecting optical properties may be mixed.

The first optical component is not necessarily press-molded, and may be formed by etching or injection molding. The second optical component may be formed by being applied onto the lens surface of the first optical component with, for example, a spin coating process or a squeezing process and then being cured.

The locations of the uneven regions in the lens surfaces are not limited to those described above. Two or more types of uneven regions may be provided in a lens surface.

In Embodiment 3, the fourth optical component may be coupled to the first optical component at the lens surface having the fourth uneven region, as in Embodiment 2.

INDUSTRIAL APPLICABILITY

As described above, the present invention is applicable to optical disk recording/reproducing devices and also applicable to imaging devices (e.g., digital still cameras and digital video cameras) and projection devices (e.g., projectors).

The invention claimed is:

1. A composite optical element, comprising:
a first optical component having a first optical functional surface;
a second optical component coupled to the first optical component at the first optical functional surface and having a second optical functional surface at a side opposite to a first coupling surface of the second optical component at which the second optical component is coupled to the first optical component; and
a third optical component coupled to the second optical component at the second optical functional surface and having a third optical functional surface at a side opposite to a second coupling surface of the third optical component at which the third optical component is coupled to the second optical component,
wherein the first, second and third optical functional surfaces partially have first, second and third uneven regions, respectively,
the first optical component is made of first glass,
the second and third optical components are made of first and second resins, respectively, and
the first resin has a softening temperature lower than a glass transition temperature of the first glass and higher than a softening temperature of the second resin.

2. The composite optical element of claim 1, wherein the first optical component has a fourth optical functional surface at a side opposite to the first optical functional surface, and
the fourth optical functional surface partially has a fourth uneven region.

3. The composite optical element of claim 2, further comprising a fourth optical component coupled to the first optical component at the fourth optical functional surface and having a fifth optical functional surface at a side opposite to a third coupling surface of the fourth optical component at which the fourth optical component is coupled to the first optical component,
the fifth optical functional surface partially has a fifth uneven region.

4. The composite optical element of claim 1, wherein each of the first, second and third uneven regions is at least one of a diffraction part, a lens array region including a plurality of concave or convex lens surfaces, a phase stepped region, and an antireflective region.

5. The composite optical element of claim 1, wherein each of the first and second resins is an energy-curing resin.

6. The composite optical element of claim 5, wherein each of the first and second resins is an energy-curing resin.

* * * * *